(12) United States Patent
Nishimaki

(10) Patent No.: US 8,908,207 B2
(45) Date of Patent: Dec. 9, 2014

(54) PRINT SERVER, PRINT CONTROL SYSTEM AND PRINT CONTROL METHOD HAVING A RASTER IMAGE PROCESSOR (RIP) FUNCTION

(75) Inventor: Tsutomu Nishimaki, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 529 days.

(21) Appl. No.: 13/116,339

(22) Filed: May 26, 2011

(65) Prior Publication Data

US 2011/0299114 A1 Dec. 8, 2011

(30) Foreign Application Priority Data

Jun. 4, 2010 (JP) .................................. 2010-129291

(51) Int. Cl.
*G06F 15/00* (2006.01)
*G06K 1/00* (2006.01)
*G06F 3/12* (2006.01)

(52) U.S. Cl.
CPC ............ *G06F 3/1288* (2013.01); *G06F 3/1213* (2013.01); *G06F 3/1244* (2013.01)
USPC .......................... 358/1.15; 358/1.9; 358/1.13

(58) Field of Classification Search
None
See application file for complete search history.

(56) References Cited

U.S. PATENT DOCUMENTS

| 7,016,061 | B1 * | 3/2006 | Hewitt ......................... 358/1.15 |
| 2001/0043355 | A1 | 11/2001 | Bando | |
| 2002/0041388 | A1 | 4/2002 | Aoki | |
| 2004/0012797 | A1 * | 1/2004 | Letellier ........................ 358/1.9 |
| 2004/0061892 | A1 * | 4/2004 | Ferlitsch ...................... 358/1.15 |
| 2004/0196493 | A1 * | 10/2004 | Christiansen et al. ....... 358/1.15 |
| 2007/0036598 | A1 * | 2/2007 | Toda ............................... 400/62 |
| 2007/0070376 | A1 * | 3/2007 | Owen et al. .................. 358/1.13 |
| 2007/0081186 | A1 * | 4/2007 | Numata ....................... 358/1.15 |
| 2007/0165266 | A1 * | 7/2007 | Tian ............................. 358/1.15 |
| 2009/0237721 | A1 * | 9/2009 | Jeong et al. ................. 358/1.15 |
| 2012/0170068 | A1 * | 7/2012 | Ikeda et al. .................. 358/1.13 |
| 2012/0200884 | A1 * | 8/2012 | Iwase ........................... 358/1.15 |

FOREIGN PATENT DOCUMENTS

| JP | 10-040039 A | 2/1998 |
| JP | 10-326165 A | 12/1998 |

* cited by examiner

*Primary Examiner* — Ming Hon

(74) *Attorney, Agent, or Firm* — Buchanan Ingersoll & Rooney PC

(57) ABSTRACT

A print server is linked through a communication network to a client device for sending PDL data, and an image forming apparatus provided with a RIP section for creating raster data by rasterizing the PDL data and a printer section for executing printing according to the raster data. This print server is provided with at least a RIP section for creating raster data by rasterizing the PDL data received from the client device, and a control section that compares the time to be taken before output when the PDL data received from the aforementioned client device is sent to the image forming apparatus with the time to be taken before output when the raster data created by the RIP section of the printer server is sent to the image forming apparatus, whereby the data whose length of time before the output is shorter is sent to the image forming apparatus.

15 Claims, 5 Drawing Sheets

PRINT SERVER, PRINT CONTROL SYSTEM AND PRINT CONTROL METHOD HAVING A RASTER IMAGE PROCESSOR (RIP) FUNCTION

This application is based on Japanese Patent Application No. 2010-129291 filed on Jun. 4, 2010 with Japanese Patent Office, the entire content of which is hereby incorporated by reference.

BACKGROUND OF THE INVENTION

The present invention relates to a print server, a print control system and a print control method, particularly to a print server provided with a RIP (Raster Image Processor) function, a print control system including the aforementioned print server and an image forming apparatus provided with the RIP function, and a print control method for the aforementioned print control system.

There has been a widespread use of a printing device (hereinafter referred to as an image forming apparatus) such as a photocopier and MFP (Multi-Function Peripheral). When this image forming apparatus is used for printing, the data in the PDL (Page Description Language) format (hereinafter referred to as PDL data) is received from the client device linked to a network. The PDL data is then rasterized (development in bit-map format) to create raster data and printing is executed based on the raster data.

In a system to which plural image forming apparatuses are connected through a communication network, if the process of creating raster data from PDL data (hereinafter referred to as RIP processing) is performed by each of the image forming apparatuses, each image forming apparatus is required to incorporate, into it, the function that performs the above-mentioned RIP processing (hereinafter referred to as a RIP function), and the image forming apparatus has to be designed in a complicate configuration. To solve this problem, such a system uses a configuration in which the print server provided with the aforementioned RIP function is linked to the communication network, and RIP processing is performed collectively by the print server.

Regarding this system, for example, the Japanese Unexamined Patent Application Publication No. Hei 10-40039 discloses a printing system in which a RIP server for converting the Page Description Language (PDL) into raster image data, and an output engine as a network printer not provided with a RIP section for converting the PDL into raster image data are connected with the network. In this system, when making the output engine perform printing, the host computer outputs the PDL corresponding to the content to be printed to the RIP server, and the RIP server develops the PDL as raster image data, which is transferred to the output engine via the network to perform printing.

However, independently of the performance of the image forming apparatus for performing the operation of printing, the conventional server performs RIP processing by itself, and sends raster data to the image forming apparatus. This arrangement may prevent effective printing from being performed in some cases.

For example, if both the print server and image forming apparatus are provided with the RIP function and the RIP function of the image forming apparatus has a greater processing capacity, it is more effective to allow RIP processing to be performed by the image forming apparatus. According to the conventional method, however, RIP processing is performed on the print server side even in such a case, and raster data is sent to the image forming apparatus. This requires a longer time before the output starts.

Also, when the data transfer speed of the communication network is low, it is more effective to send the PDL data which has a smaller data size. Even in such a case, however, RIP processing is performed on the print server side in the conventional method, and the raster data of a greater size is sent. This requires a longer data transmission time, and takes a longer time before the output starts.

The present invention is intended to solve the aforementioned problems. Accordingly a main object of this invention is to provide a print server, a print control system and a print control method where effective printing can be achieved.

SUMMARY

To achieve at least one of the aforementioned objects, a print server reflecting one aspect of the present invention includes:

1. A print server connected, through a communication network, with a client device for transferring PDL data and an image forming apparatus including a RIP section for creating raster data by rasterizing the PDL data and a printer section for printing based on the raster data, with the print server including: a RIP section for creating raster data by rasterizing the PDL data received from the client device; and a control section which compares a preparing time for an output when transferring the PDL data received from the client device to the image forming apparatus with a preparing time for the output when transferring the raster data created in the RIP section of the print server to the image forming apparatus, and transfers, to the image forming apparatus, one of the data which takes a shorter preparing time for the output.

2. It is preferable that another embodiment of the present invention includes the print server of the above item 1 further including: a storage section for storing information on processing capacities of the RIP section of the image forming apparatus and the RIP section of the print server, wherein when having received the PDL data from the client device, the control section refers to the information on the processing capacities and calculates a first required time period necessary for creating the raster data in the RIP section of the image forming apparatus and the second required time period necessary for creating the raster data in the RIP section of the print server, and then when the first required time period is greater than the second required time period, the control section transfers the raster data created by the RIP section of the print server to the image forming apparatus and when the first required time period is equal to or sir taller than the second required time period, the control section transferred the PDL data received from the client device to the image forming apparatus.

3. It is preferable that a further embodiment of the present invention includes the print server of the above item 2, wherein the storage section further stores information on a data transfer capacity of the communication network, and the control section refers to the information on the data transfer capacity and adds, to the first required time period, a required time period necessary for transferring the received PDL data to the image forming apparatus and adds, to the second required time period, a required time period necessary for transferring the raster data created by the RIP section of the print server.

4. It is preferable that a still further embodiment of the present invention includes the print server of the above item 1, further including: a storage section for storing the PDL data received from the client device, the raster data created by the RIP section of the print server, information on processing capacity of the RIP section of the image forming apparatus and information on a data transfer capacity of the communication network, wherein when an instruction of printing based on the data stored in the storage section has been given, the control section refers to the information on the processing capacity and on the data transfer capacity, and calculate a first required time period necessary for transferring the PDL data stored in the storage section to the image forming apparatus and creating the raster data in the RIP section of the image forming apparatus and a second required time period necessary for transferring the raster data stored in the storage section to the image forming apparatus and if the first required time period is greater than the second required time period, the control section transfers the raster data stored in the storage section to the image forming apparatus and if the first required time period is equal to or smaller than the second required time period, the control section transfers the PDL data stored in the storage section to the image forming apparatus.

DETAILED DESCRIPTION OF PREFERRED EMBODIMENT

As described above, the conventional art is capable of allowing the server to execute RIP processing and sending the raster data that underwent the RIP processing to the image forming apparatus. However, the conventional server has not function of determining whether PDL data should be sent or whether raster data should be sent to each of the image forming apparatuses for performing the printing operation. Accordingly, RIP processing is performed on the server side even though RIP processing is quicker on the image forming apparatus side, or the raster data of a greater size is sent even though longer time is required to transfer data, with the result that efficient printing cannot be achieved in the conventional art.

In a print control system with a RIP section provided on each of the print server and image forming apparatus as one embodiment of the present invention, the print server calculates and compares the time period to be taken before output when the PDL data is sent to the image forming apparatus and the raster data is created by the RIP section of the image forming apparatus and the time period to be taken before output when the raster data created by its own RIP section is sent to the image forming apparatus. Based on the result of the comparison, the print server determines whether the PDL data before RIP processing should be sent to the image forming apparatus or whether the raster data after RIP processing should be sent.

For example, when the printing operation is to be performed by the image forming apparatus characterized by low processing capacity of the RIP section (low RIP processing speed), RIP processing is executed by the print server and raster data is sent. While when the printing operation is to be performed by the image forming apparatus characterized by high processing capacity of the RIP section (high RIP processing speed), the PDL data before RIP processing is sent as is, and RIP processing is executed by the image forming apparatus.

Further, with consideration given to the data transfer capacity of the communication network, the total of the PDL data transmission time period and RIP processing time period by the image forming apparatus is compared with the total of the RIP processing time period on the print server side and raster data transmission time period. Then, the method, which takes a shorter time period, is selected.

Further, when the raster data that has been RIP-processed by the print server is stored therein, the total of the PDL data transmission time period and RIP processing time period by the image forming apparatus is compared with the raster data transmission time period. Then, the method which takes a shorter time period, is selected.

The aforementioned procedure reduces the time before the termination of printing and ensures efficient printing.

EXAMPLE

Figure 1:
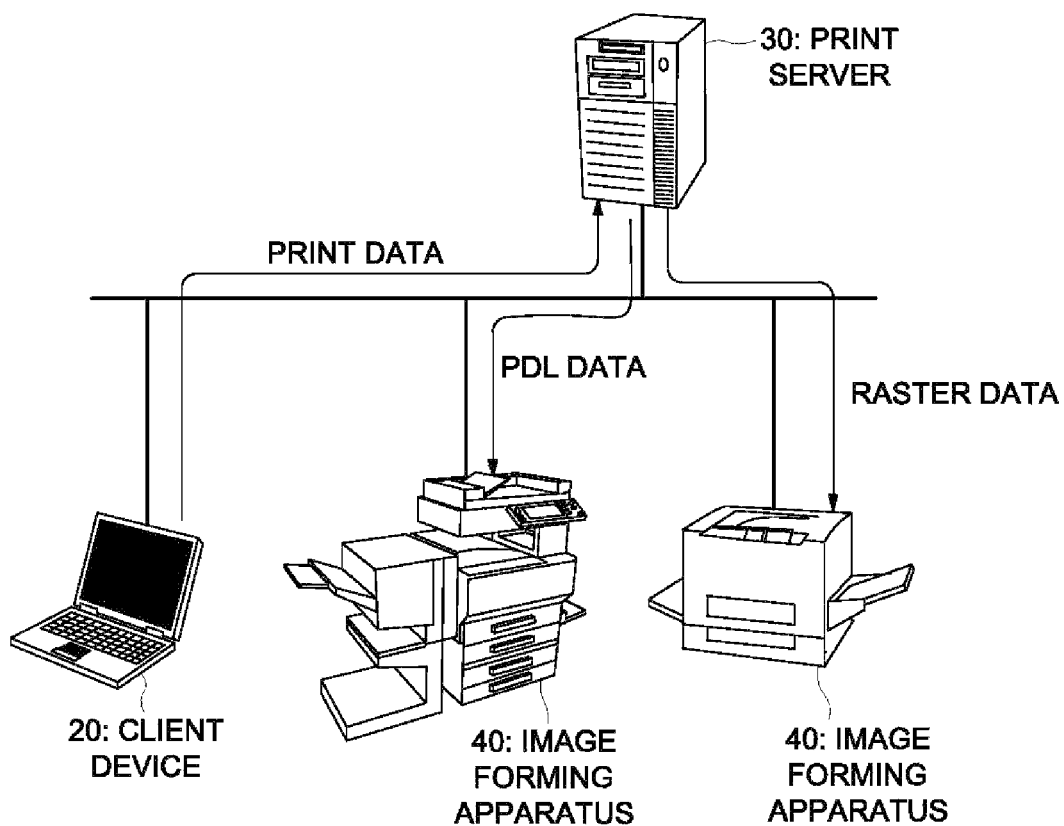
FIG. 1 is a diagram showing the configuration of a print control system related to an example of the present invention.
Figure 2:
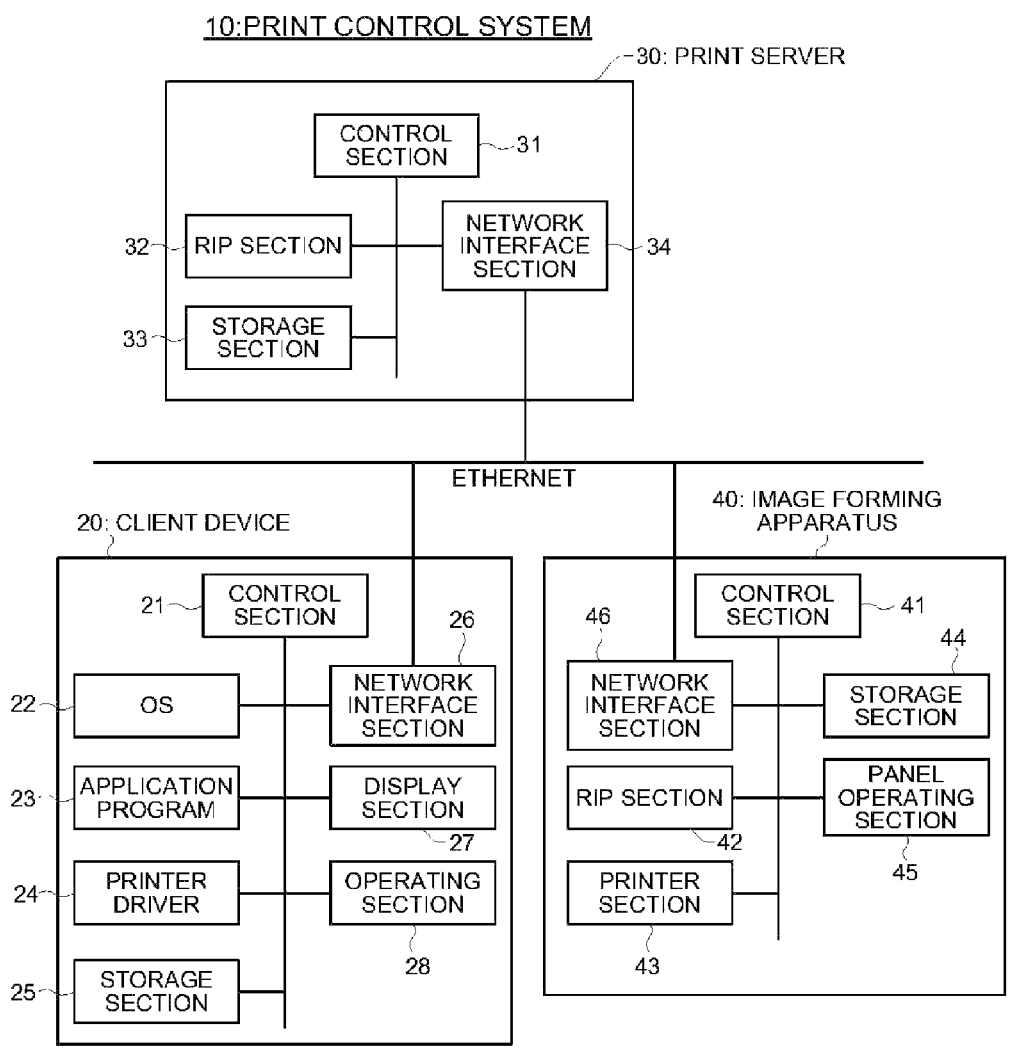
FIG. 2 is a block diagram showing the configuration of the print server, client device and image forming apparatus related to an example of the present invention.
Figure 3:
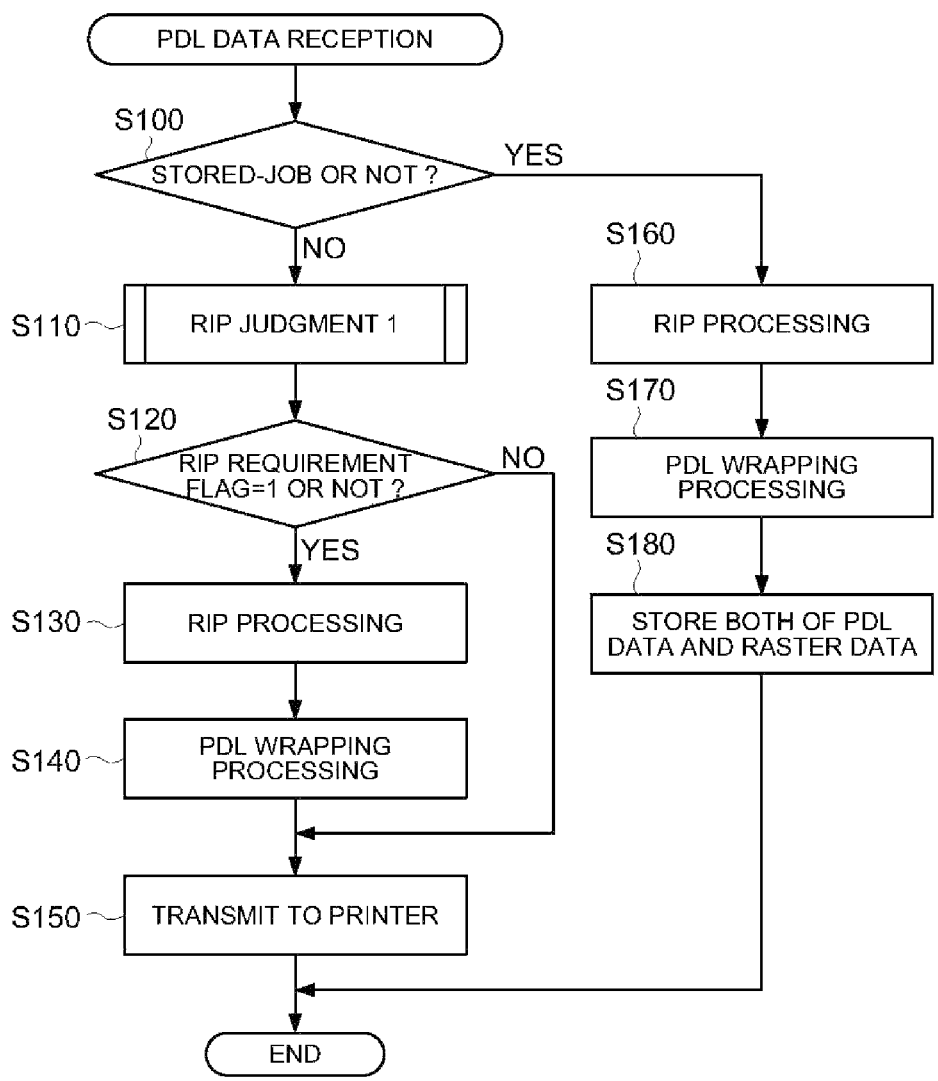
FIG. 3 is a flow chart showing the operation (when PDL data has been received) of the print server related to an example of the present invention.
Figure 4:
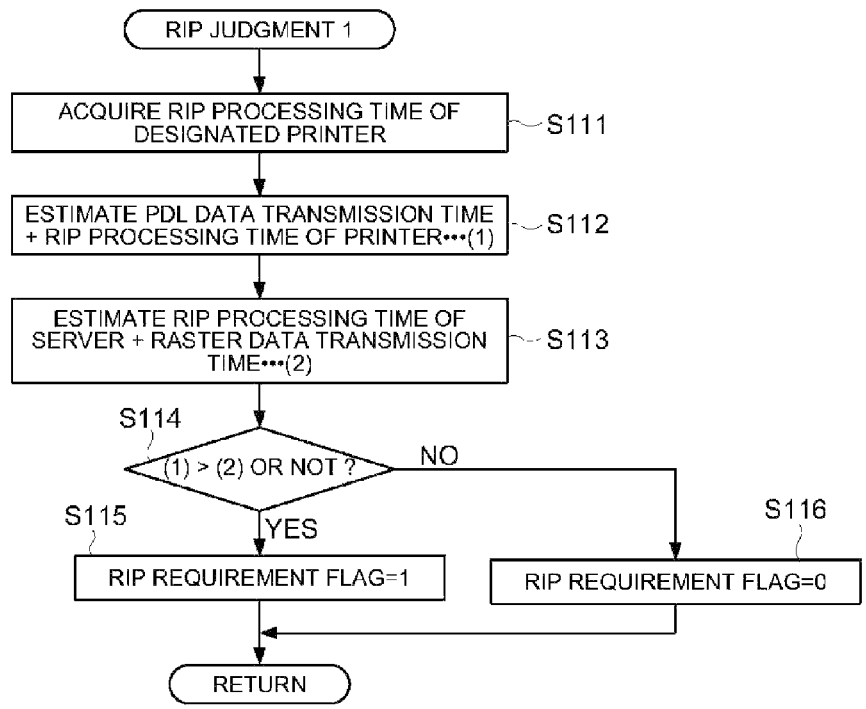
FIG. 4 is a flow chart showing the operation (in RIP Judgment 1 of FIG. 3) of the print server related to an example of the present invention.
Figure 5:
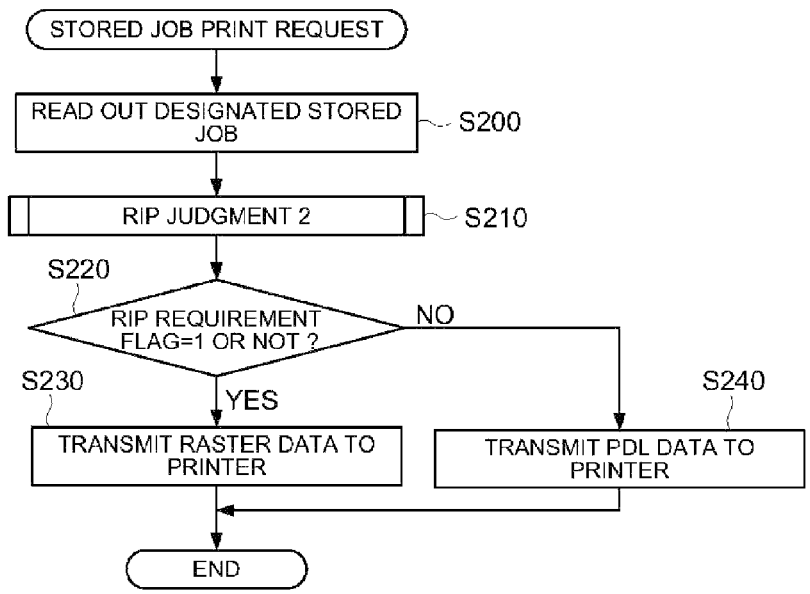
FIG. 5 is a flow chart showing the operation (when an instruction has been given to print the stored job) of the print server related to an example of the present invention.
Figure 6:
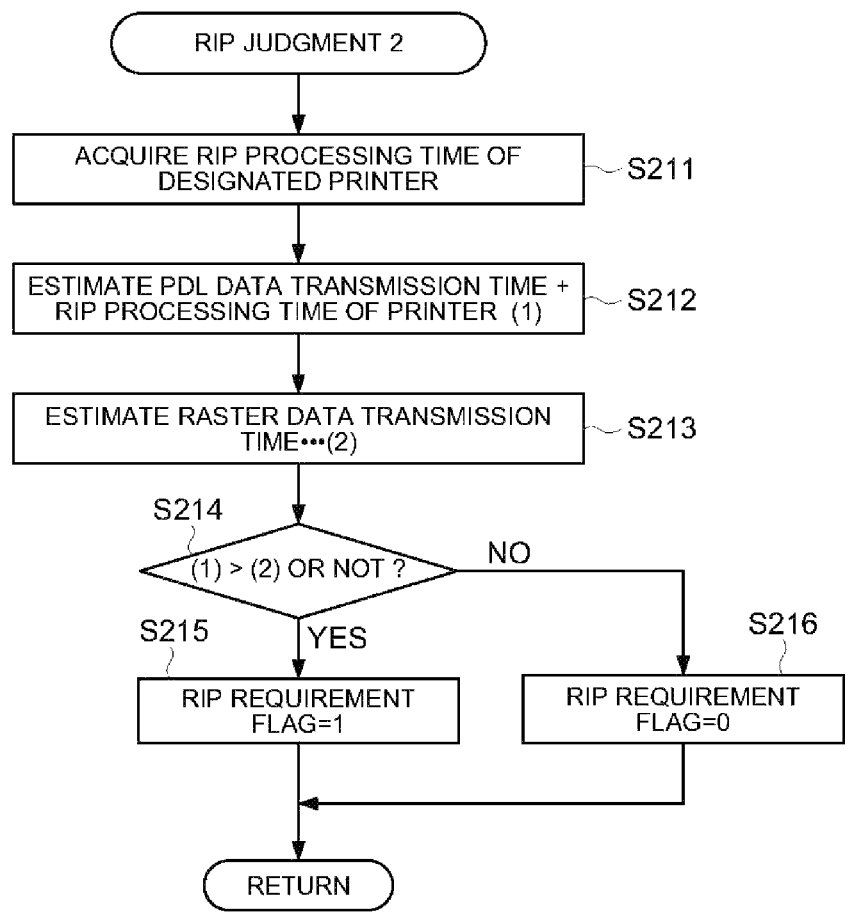
FIG. 6 is a flow chart showing the operation (in RIP Judgment 2 of FIG. 5) of the print server related to an example of the present invention.

Referring to FIGS. 1 through 6, the following describes the print server and print control system and print control method in an example of the present invention for the purpose of giving greater details of an embodiment of the present invention. FIG. 1 schematically shows the configuration of a print control system in the present example. FIG. 2 is a block diagram showing the configuration of the client device, print server, and image forming apparatus. FIGS. 3 and 4 are flow charts showing the operation of the print server when PDL data has been received. FIGS. 5 and 6 are flow charts showing the operation of the print server when a printing instruction of the stored job has been given.

As shown in FIG. 1, the print control system 10 of the present example includes a client device 20 for creating PDL data and sending it to a print server 30 and the print server 30 for receiving PDL data and sending to the image forming apparatus 40, either the received PDL data or the raster data obtained by rasterizing the PDL data and an image forming apparatus 40 for receiving either PDL data or raster data to execute printing. These devices are connected through a communication network such as a LAN (Local Area Network) or WAN (Wide Area Network). The following describes the details of the configuration of these devices with reference to block diagram of FIG. 2.

[Client Device]

The client device 20 is a computer apparatus, such as a personal computer and is provided with a control section 21, an OS (Operating System) 22, an application program 23, a printer driver 24, a storage section 25, a network interface section 26, a display section 27, an operating section 28 and others.

The control section 21 is constituted by a CPU (Central Processing Unit), memories such as a ROM (Read Only Memory) and a RAM (Random Access Memory) so as to control overall operations of the client device 20. The Windows (Registered Trademark), the Macintosh (Registered Trademark) or the like is employed as the OS 22, which makes the application program 23 executable in the client device 20. The application program 23 is a kind of software for creating document data. The printer driver 24 converts the document data created by the application program 23, to PDL data which is readable by the print server 30. The storage section 25 is constituted by a memory, an HDD (Hard Disk Drive) or the like, so as to store the document data or PGL data therein. The network interface section 26 is constituted by the NIC (Network Interface Card) or the like, so as to couple the client device 20 to the communication network. Further, the display section 27 is constituted by an LCD (Liquid Crystal Display) or the like, so as to display a document creation screen of the application program 23 or a setting screen of the printer driver 24 thereon. Still further, the operating section 28 is constituted by a mouse, a keyboard or the like, so as to make operations possible for document creation or print instruction.

[Print Server]

The print server 30 is a device for managing the PDL data created by the client device 20, and is provided with a control section 31, RIP section 32, storage section 33, and network interface section 34. If required, the print server 30 is also provided with a display section and operating section.

The control section 31 includes a CPU and such a memory as a ROM and RAM, and provides overall control of the print server 30. The RIP section 32 develops the PDL data in a bit-map format and creates raster data. If required, the RIP section 32 applies screening and image processing to the raster data. The storage section 33 is composed of a memory, HDD and others, and stores the PDL data received from the client device 20, raster data created by the RIP section 32, the processing capacity information of the print server 30 (e.g., RIP processing time period for the test data for measuring the RIP processing time period), a table describing the processing capacity information of each image forming apparatus 40 (e.g., presence or absence of the RIP section, and RIP processing time period for the test data mentioned above), the data transfer capacity information of the communication network (e.g., data transfer speed), and the aforementioned test data. The network interface section 34 includes an NIC and connects the print server 30 to a communication network.

Upon receipt of the PDL data from the client device 20, the aforementioned control section 31 references the aforementioned table, and checks whether or not the RIP section is located in the designated image forming apparatus 40. If the RIP section is located in the designated image forming apparatus 40, the control section 31 references the processing capacity information of the print server 30 stored in the storage section 33 and the processing capacity information of the image forming apparatus 40, and the data transfer capacity information of the communication network, and calculates the required time period by adding the time period for sending the PDL data before being RIP-processed to the image forming apparatus 40, to the time period for RIP processing of the PDL data by the RIP section of the image forming apparatus 40. Further, the control section 31 calculates the required time period by adding the time period for RIP processing of the PDL data by the RIP section 32 of the print server 30, to the time period for sending the raster data after RIP processing to the image forming apparatus. Then the calculated results are compared. If the former required time period is greater than the latter required time period as a result of comparison, or the RIP section is not included in the image forming apparatus 40, the RIP processing is applied to the data by the RIP section 32 of the print server 30, and the raster data after RIP processing is sent to the image forming apparatus 40, under the control of the control section 31. If the former required time period is equal to or smaller than the latter required time period, the PDL data is sent to the image forming apparatus 40 as is. RIP processing is applied to the data by the RIP section of the image forming apparatus 40, under the control of the control section 31. The aforementioned processing can be performed in terms of hardware, or a printing control program can be configured in such a way that the aforementioned processing is performed by the print server 30 to execute the printing control program in the control section 31.

In the present example, when these required time periods are the same, RIP processing is performed by the RIP section of the image forming apparatus 40. However, the RIP section 32 of the print server 30 can be used for RIP processing. Further, in the present example, the total of the RIP processing time period and data transmission time period is used for the comparison. However, use of RIP processing time period alone for the comparison is also possible. When other PDL data is subjected to RIP processing by the print server 30 or another job is being processed by the image forming apparatus 40, the standby time until such processing terminates can be given consideration. Further, when the raster data has been created by the RIP section 32 in advance, the required time period obtained by adding the time period for sending the PDL data before RIP processing to the image forming apparatus 40, to the time period for RIP processing by the RIP section of the image forming apparatus 40 can be compared with the time period for sending the raster data after RIP processing to the image forming apparatus 40.

[Image Forming Apparatus]

The image forming apparatus 40 executes printing based on the PDL data or the raster data received from the print server 30, and is provided with a control section 41, RIP section 42, printer section 43, storage section 44, panel operating section 45, network interface section 46 and others.

The control section 41 includes a CPU and such a memory as a ROM and RAM, and provides overall control of the image forming apparatus 40. Upon receipt of PDL data from the print server 30, the RIP section 42 develops the PDL data in a bit-map format, and creates raster data. The raster data is subjected to screening, image processing, when required. The printer section 43 is provided with a photoreceptor, charging device, exposure device, development device, transfer device, fixing device and others, and executes printing in conformance to the printing instruction. The storage section 44 includes a memory and HDD, and stores the PDL data, raster data, and the processing capacity information of this device (e.g., RIP processing time period for test data). The panel operating section 45 is configured in such a way that a pressure sensitive operating section (touch panel) having transparent electrodes arranged in a grid-shaped pattern is provided on the display section, and enables operation of the image forming apparatus 40 and registration of the processing capacity information. The network interface section 46 is composed of a NIC and others, which interface the image forming apparatus 40 with a communication network.

FIGS. 1 and 2 show an example of the print control system 10 in the present example. The configuration thereof can be modified as desired, if this system includes a print server 30 provided with the aforementioned functions and at least one image forming apparatus 40 provided with the RIP section 42.

The following describes the print server 30 of the aforementioned configuration: In the following description, it is assumed that the print server 30 acquires the processing capacity information (RIP processing time period for the aforementioned test data) from each of the image forming apparatuses 40 by the SNMP (Simple Network Management Protocol)—MIB (Management Information Base) and others, and this information is stored in the form of a table in the storage section 33 in advance.

In the first place, the following describes the operation of the print server 30 when the PDL data has been received from the client device 20, with reference to the flow charts of FIGS. 3 and 4.

When the print server 30 has received the PDL data from the client device 20, the control section 31 determines if the job in conformance to the PDL data is a regular job or a stored-job (S100) according to the information described on the header or others of the PDL data.

In the regular job, an image forming apparatus 40 is designated by the printer driver 24 of the client device 20, and printing is immediately started by the designated image forming apparatus 40. In the stored-job, the job data is stored in the print server 30, without the image forming apparatus 40 being designated by the printer driver 24 of the client device 20 and, when the user instructs printing from an image forming apparatus 40, data (PDL data or raster data) is sent to that image forming apparatus 40 from the print server 30, and the printing is executed. The regular job or stored-job can be selected by the job setting of the printer driver 24 of the client device 20.

In the case of a stored-job (Yin S100), the RIP section 32 applies RIP processing to the PDL data (S160), and the control section 31 provides wrap processing where the raster data after RIP processing is wrapped by the PDL (S170). This wrap processing associates the raster data after RIP processing with the print instruction information as a set of data. After that, the control section 31 stores both the PDL data and raster data in the storage section 33 (S180), and terminates processing.

In the case of a regular job (N in S100), the control section 31 determines if the RIP section 32 is applied to conduct RIP processing or not (S110). The details of this Step (RIP Judgment 1) will be described with reference to the flow chart of FIG. 4.

In the first place, the RIP processing time period for the test data by the image forming apparatus 40 designated as an output destination is acquired from the storage section 33 (S111).

This is followed by the step of getting the PDL data transmission time period (e.g., data transfer speed×data size of PDL data), based on the data transfer speed of the communication network and size of the PDL data. Also, based on the aforementioned RIP processing time period by the image forming apparatus 40 for the test data and the data size of the PDL data, the RIP processing time period by the designated image forming apparatus 40 (e.g., RIP processing time period for test data×data size of PDL data/data size of test data) is obtained. Then the required time period (1) is estimated by addition of the obtained data (S112).

This is followed by the step of obtaining the RIP processing time period by the printer server 30 (e.g., RIP processing time period for test data×data size of PDL data/data size of test data) based on the RIP processing time by the print server 30 for the test data and the data size of the PDL data. Also, the raster data transmission time period (e.g., data transfer speed×data size of raster data) is obtained based on the data transfer speed of the communication network and the data size of the raster data after RIP processing. The required time period (2) is estimated by addition of the obtained data (S113).

The required time period (1) obtained in S112 is compared with the required time period (2) obtained in S113 (S114). If the required time period (1) is greater than the required time period (2) (i.e., if the RIP processing by the print server 30 is faster), "1" is set to the RIP-requirement-flag (S115). If the required time period (1) in equal to or smaller than the required time period (2) (i.e., if the RIP processing by the image forming apparatus 40 is faster than or equal to the processing by the print server 30), "0" is set to the RIP-requirement-flag (S116).

Going back to FIG. 3, the control section 31 determines whether or not "1" is set to the RIP-requirement-flag (S120). If "1" is not set to the RIP-requirement-flag, the image forming apparatus 40 is estimated to perform the RIP processing at a higher speed (or at the same speed). Thus, the PDL data is sent to the image forming apparatus 40 as is without performing RIP processing by the print server 30 (S150).

If "1" is set to the RIP-requirement-flag, the print server 30 is estimated to perform faster RIP processing. Thus, the RIP section 32 applies RIP processing to the PDL data (S130). The control section 31 provides the raster data after RIP processing with wrapping by PDL (S140). After that, the control section 31 sends the raster data after RIP processing to the image forming apparatus 40 (S150).

As described above, the required time period obtained by adding the PDL data transmission time period to the RIP processing time period by the image forming apparatus 40 is compared with the required time period obtained by adding the RIP processing time period by the print server 30 to the transmission time period of the raster data after RIP processing. According to the result of this comparison, a step is taken to determine which data out of the PDL data and PDL data should be sent to the image forming apparatus 40. This procedure ensures efficient printing.

Referring to the flow charts of FIGS. 5 and 6 the following describes the operation of the print server 30 when printing of a stored job has been instructed:

The user accesses the print server 30 from the image forming apparatus 40 and selects the stored job to be printed. Then a print request is sent from the image forming apparatus 40 to the print server 30. The control section 31 of the print server 30 reads the designated stored job from the storage section 33 (S200), and a step is taken to determine which data out of the PDL data and raster data should be sent to the image forming apparatus 40 (S210). Referring to the flow chart of FIG. 6, the following describes the details of this Step (RIP Judgment 2).

The RIP processing time period for the test data by the image forming apparatus 40 designated as an output destination is acquired from the storage section 33 (S211).

This is followed by the step of getting the PDL data transmission time period (e.g., data transfer speed×data size of PDL data), based on the data transfer speed of the communication network and size of the PDL data. Also, based on the aforementioned RIP processing time period for the test data and the data size of the PDL data, the RIP processing time period by the designated image forming apparatus 40 (e.g., RIP processing time period for test data×data size of PDL data/data size of test data) is obtained. These results are added to estimate the required time period (1) (S212).

The raster data transmission time period (e.g., data transfer speed×data size of raster data) is calculated based on the data transfer speed of the communication network and the data size of the raster data after RIP processing. Then the required time period (2) is estimated (S213).

The required time period (1) calculated in S212 is compared with the required time period (2) calculated in S213 (S214). If the required time period (1) is greater than the required time period (2) (i.e., if faster processing is ensured by transfer of the raster data), "1" is set to the RIP-requirement-flag (S215). If the required time period (1) is equal to or smaller than the required time period (2) (i.e., if processing at a higher speed or the same speed is ensured by transferring the PDL data to the image forming apparatus 40 so that the data is RIP-processed by the image forming apparatus 40), "0" is set to the RIP-requirement-flag (S216).

Going back to FIG. 5, the control section 31 determines if "1" is set to the RIP-requirement-flag (S220). If "1" is set to the RIP-requirement-flag, faster processing is estimated to be achieved by transfer of the raster data. Thus, the raster data after RIP processing is wrapped with the PDL and is sent to the image forming apparatus 40 (S230). The image forming apparatus 40 executes printing using the received raster data.

If "1" is not set to the RIP-requirement-flag, RIP processing is estimated to be achieved at a higher speed (or the same speed) by the image forming apparatus 40. Thus, the control section 31 sends the PDL data to the image forming apparatus 40 (S240), and the image forming apparatus 40 applies RIP processing to the received PDL data to create raster data and then executes printing using the raster data.

As described above, the required time period obtained by adding the PDL data transmission time period to the RIP processing time period by the image forming apparatus 40 is compared with the transmission time period of the raster data after RIP processing. According to the result of the comparison, a step is taken to determine which data out of the PDL data and raster data should be sent to the image forming apparatus 40. This procedure ensures efficient printing.

The present invention is not restricted to the aforementioned examples. The configuration and control of present invention can be changed as required without departing from the principles of the present invention.

For example, in the aforementioned examples, the RIP processing time period and data transmission time period are used, and a step is taken to determine which data out of the PDL data and raster data should be sent to the image forming apparatus 40. It is possible to arrange a configuration by giving consideration to other factors (e.g., which should be used for the RIP processing in order to get higher image quality).

In the aforementioned examples, transmission time periods of the PDL data and raster data are calculated based on the data transfer speed of the communication network. It is also possible to take account of the capacity (data transmission speed) of the network interface section 34 of the print server 30 and the capacity (data reception speed) of the network interface section 46 of the image forming apparatus 40.

If the color matching function, which is not supported by the image forming apparatus 40, is added to the RIP section 32 of the print server 30, and the color matching information for each of the image forming apparatuses 40 is stored in the storage section 33, high-precision printing can be performed through application of RIP processing by the print server 30. In this case, when high-precision printing is not required, control of the present examples is used.

When receiving the PDL data of the format which is not supported by the image forming apparatus 40, the print server 30 converts it into the PDL data of the format supported by the image forming apparatus 40. After that, control of the present examples can be implemented.

The embodiment of the present invention is applicable to the system including a print server provided with a RIP function, and at least one image forming apparatus provided with a RIP function.

As described above, effective printing can be achieved by a print server, print control system and print control method in the embodiments of the present invention.

It is because, in a print control system including a print server provided with a RIP section and an image forming apparatus provided with a RIP section, control is provided in such a way that the print server calculates and compares the time period to be taken before output when PDL data is sent to the image forming apparatus and raster data is created by the RIP section of the image forming apparatus and the time period to be taken before output when the raster data created by its own RIP section is sent to the image forming apparatus, and the data which will be outputted earlier is sent to the image forming apparatus.

What is claimed is:

1. A print server connected, through a communication network, with a client device for transferring PDL data and an image forming apparatus including a RIP section for creating raster data by rasterizing the PDL data and a printer section for printing based on the raster data, the print server comprising:

a RIP section for creating raster data by rasterizing the PDL data received from the client device;

a control section configured to determine if the PDL data received from the client device is a regular job, which designates the image forming apparatus for immediate printing, or a stored job, which is stored in the print server, without the image forming apparatus being designated by the client device, and wherein the control section is configured to compare a preparing time for an output when transferring the PDL data received from the client device to the image forming apparatus with a preparing time for the output when transferring the raster data created in the RIP section of the print server to the image forming apparatus, and transfers, to the image forming apparatus, one of the data which takes a shorter preparing time for the output;

a storage section configured to store the PDL data received from the client device in the form of the stored job, which is stored on the print server until an instruction of printing based on the data stored in the storage section is given by the image forming apparatus to the print server;

wherein upon receipt of the PDL data of the stored job, the PDL data is rasterized by the RIP section, and both the PDL data and raster data for the stored job is stored in the storage section until the instruction of printing is given by the image forming apparatus to the print server;

wherein the storage section further is configured to store the raster data created by the RIP section of the print server, information on processing capacity of the RIP section of the image forming apparatus and information on a data transfer capacity of the communication network; and wherein when the instruction of printing based on the data stored in the storage section has been given, the control section refers to the information on the processing capacity and on the data transfer capacity, and calculates a first required time period necessary for transferring the PDL data stored in the storage section to the image forming apparatus and creating the raster data in the RIP section of the image forming apparatus and a second required time period necessary for transferring the raster data stored in the storage section to the image forming apparatus and if the first required time period is greater than the second required time period, the control section transfers the raster data stored in the storage section to the image forming apparatus and if the first required time period is equal to or smaller than the second required time period, the control section transfers the PDL data stored in the storage section to the image forming apparatus.

2. The print server of claim 1,
wherein the storage section is configured to store information on processing capacities of the RIP section of the image forming apparatus and the RIP section of the print server,
wherein when having received the PDL data from the client device, the control section refers to the information on the processing capacities and calculates a first required time period necessary for creating the raster data in the RIP section of the image forming apparatus and the second required time period necessary for creating the raster data in the RIP section of the print server, and then when the first required time period is greater than the second required time period, the control section transfers the raster data created by the RIP section of the print server to the image forming apparatus and when the first required time period is equal to or smaller than the second required time period, the control section transferred the PDL data received from the client device to the image forming apparatus.

3. The print server of claim 2,
wherein the storage section further stores information on a data transfer capacity of the communication network, and the control section refers to the information on the data transfer capacity and adds, to the first required time period, a required time period necessary for transferring the received PDL data to the image forming apparatus and adds, to the second required time period, a required time period necessary for transferring the raster data created by the RIP section of the print server.

4. The print server of claim 1,
wherein when receiving the PDL data from the client device, which is in a format which is not supported by the image forming apparatus, converting the PDL data into a PDL data format, which is supported by the image forming apparatus.

5. The print server of claim 1,
wherein the storage section further includes color matching information for the image forming apparatus, wherein if the PDL data includes a color matching function, which is not supported by the image forming apparatus, converting the PDL data into a PDL data format, which is supported by image forming apparatus.

6. A print control system in which a client device for transferring PDL data, a print server for receiving the PDL data and an image forming apparatus are connected with one another, through a communication network, the print server comprising:
a RIP section for creating raster data by rasterizing the PDL data received from the client device;
a control section configured to determine if the PDL data received from the client device is a regular job, which designates the image forming apparatus for immediate printing, or a stored job, which is stored in the print server, without the image forming apparatus being designated by the client device, and wherein the control section is configured to compare a preparing time for an output when transferring the PDL data received from the client device to the image forming apparatus with a preparing time for the output when transferring the raster data created by the RIP section of the print server to the image forming apparatus, and transfers, to the image forming apparatus, one of the data which takes a shorter preparing time for the output;
a storage section configured to store the PDL data received from the client device in the form of the stored job, which is stored on the print server until an instruction of printing based on the data stored in the storage section is given by the image forming apparatus to the print server, and wherein upon receipt of the PDL data of the stored job, the PDL data is rasterized by the RIP section, and both the PDL data and raster data for the stored job is stored in the storage section until the instruction of printing is given by the image forming apparatus to the print server,
wherein the image forming apparatus comprises:
a RIP section for creating the raster data by rasterizing the PDL data received from the print server;
a printer section for printing based on the raster data received from the print server or the raster data created by the RIP section of the image forming apparatus;
wherein the storage section further stores the raster data created by the RIP section of the print server, information on processing capacity of the RIP section of the image forming apparatus and information on a data transfer capacity of the communication network, and
wherein when the instruction of printing based on the data stored in the storage section has been given, the control section of the print server refers to the information on the processing capacity and on the data transfer capacity, and calculates a first required time period necessary for transferring the PDL data stored in the storage section to the image forming apparatus and creating the raster data in the RIP section of the image forming apparatus and a second required time period necessary for transferring the raster data stored in the storage section to the image forming apparatus and if the first required time period is greater than the second required time period, the control section transfers the raster data stored in the storage section to the image forming apparatus and if the first required time period is equal to or smaller than the second required time period, the control section transfers the PDL data stored in the storage section to the image forming apparatus.

7. The print control system of claim 6,
wherein the storage section further stores information on processing capacities of the RIP section of the image forming apparatus and the RIP section of the print server, and
wherein when having received the PDL data from the client device, the control section of the print server refers to the information on the processing capacities and calculates a first required time period necessary for creating the raster data in the RIP section of the image forming apparatus and the second required time period necessary for creating the raster data in the RIP section of the print server, and then when the first required time period is greater than the second required time period, the control section transfers the raster data created by the RIP section of the print server to the image forming apparatus and when the first required time period is equal to or smaller than the second required time period, the control section transferred the PDL data received from the client device to the image forming apparatus.

8. The print control system of claim 7,
wherein the storage section of the print server further stores information on a data transfer capacity of the communication network, and the control section of the print server refers to the information on the data transfer capacity and adds, to the first required time period, a required time period necessary for transferring the received PDL data to the image forming apparatus and adds, to the second required time period, a required time period necessary for transferring the raster data created by the RIP section of the print server.

9. The print control system of claim 6,
wherein when receiving the PDL data from the client device, which is in a format which is not supported by the image forming apparatus, converting the PDL data into a PDL data format, which is supported by the image forming apparatus.

10. The print control system of claim 6,
wherein the storage section further includes color matching information for the image forming apparatus, wherein if the PDL data includes a color matching function, which is not supported by the image forming apparatus, converting the PDL data into a PDL data format, which is supported by image forming apparatus.

11. A print control method for a system in which a client device for transferring PDL data, a print server including a RIP section for creating raster data by rasterizing the PDL data, and an image forming apparatus including a RIP section for creating the raster data by rasterizing the PDL data are connected with one another through a communication network, the print control method comprising the steps, executed by the print server, of:
receiving the PDL data from the client device;
determining if the PDL data received from the client device is a regular job, which designates the image forming apparatus for immediate printing, or a stored job, which is stored in the print server, without the image forming apparatus being designated by the client device;
creating raster data for the stored job by rasterizing the PDL data using the RIP section of the print server;
storing the PDL data received from the client device and the raster data for the stored job on the print server until an instruction of printing based on the data stored on the print server is given by the image forming apparatus to the print server;
calculating a first required time period necessary for creating the raster data in the RIP section of the image forming apparatus and a second required time period necessary for creating the raster data in the RIP section of the print server, by referring to information, stored in advance, on processing capacities of the RIP section of the image forming apparatus and the RIP section of the print server;
transferring the raster data created by the RIP section of the print server to the image forming apparatus when the first required time period is greater than the second required time period; and
transferring the PDL data received from the client device to the image forming apparatus when the first required time period is equal to or smaller than the second required time period,
wherein the print control method further comprises the steps, executed by the image forming apparatus, of:
creating the raster data using the RIP section of the image forming apparatus when the PDL data has been received from the print server;
printing based on the raster data received from the print server or the raster data created by the RIP section of the image forming apparatus;
wherein the storage section further is configured to store the raster data created by the RIP section of the print server, information on processing capacity of the RIP section of the image forming apparatus and information on a data transfer capacity of the communication network; and
wherein when the instruction of printing based on the data stored in the storage section has been given, the control section refers to the information on the processing capacity and on the data transfer capacity, and calculates a first required time period necessary for transferring the PDL data stored in the storage section to the image forming apparatus and creating the raster data in the RIP section of the image forming apparatus and a second required time period necessary for transferring the raster data stored in the storage section to the image forming apparatus and if the first required time period is greater than the second required time period, the control section transfers the raster data stored in the storage section to the image forming apparatus and if the first required time period is equal to or smaller than the second required time period, the control section transfers the PDL data stored in the storage section to the image forming apparatus.

12. The print control method of claim 11,
wherein in the calculating step, by referring to information on a data transfer capacity of the communication network stored in advance, a required time period necessary for transferring the received PDL data to the image forming apparatus is added to the first required time period and a required time period necessary for transferring the raster data created by the RIP section of the print server to the image forming apparatus is added to the second required time period.

13. The print control method of claim 11,
wherein when receiving the PDL data from the client device, which is in a format which is not supported by the image forming apparatus, converting the PDL data into a PDL data format, which is supported by the image forming apparatus.

14. The print control method of claim 11,
wherein the print server further includes color matching information for the image forming apparatus, wherein if the PDL data includes a color matching function, which is not supported by the image forming apparatus, converting the PDL data into a PDL data format, which is supported by image forming apparatus.

15. A print control method for a system in which a client device for transferring PDL data, a print server including a RIP section for creating raster data by rasterizing the PDL data, and an image forming apparatus including a RIP section for creating the raster data by rasterizing the PDL data are connected with one another through a communication network, the print control method comprising the steps, executed by the print server, of:
receiving the PDL data from the client device;
determining if the PDL data received from the client device is a regular job, which designates the image forming apparatus for immediate printing, or a stored job, which is stored in the print server, without the image forming apparatus being designated by the client device;
creating raster data for the stored job by rasterizing the PDL data using the RIP section of the print server;
storing the PDL data received from the client device and the raster data for the stored job on the print server until an instruction of printing based on the data stored on the print server is given by the image forming apparatus to the print server;
calculating a first required time period necessary for transferring the stored PDL data to the image forming apparatus and creating the raster data in the RIP section of the image forming apparatus and a second required time period necessary for transferring the stored raster data to the image forming apparatus by referring to information, stored in advance, on processing capacity of the RIP section of the image forming apparatus and on a data transfer capacity of the communication network when an instruction is given to print according to the stored data;

transferring the stored raster data to the image forming apparatus when the first required time period is greater than the second required time period; and transferring the stored PDL data to the image forming apparatus when the first required time period is equal to or smaller than the second required time period, wherein the print control method further comprises the steps, executed by the image forming apparatus, of:

creating the raster data using the RIP section of the image forming apparatus when the PDL data has been received from the print server; and printing based on the raster data received from the print server or the raster data created by the RIP section of the image forming apparatus.

* * * * *